United States Patent [19]
Ruekberg

[11] 3,733,158
[45] May 15, 1973

[54] ELECTROSTATIC MOLDING APPARATUS FOR PREPARING THERMOPLASTIC ARTICLES

[75] Inventor: Herbert S. Ruekberg, Highland Park, Ill.

[73] Assignee: Continental Can Company, Inc., New York, N.Y.

[22] Filed: June 2, 1969

[21] Appl. No.: 855,790

Related U.S. Application Data

[62] Division of Ser. No. 499,893, Oct. 21, 1965, Pat. No. 3,478,387.

[52] U.S. Cl. ..................425/174, 425/117, 425/130, 425/197
[51] Int. Cl. ................................................B29c 5/04
[58] Field of Search ...................18/5 M, 5 P, 5 BM, 18/26 R, 2 RM, 30 O; 264/24; 425/174, 197, 130, 117

[56] References Cited
UNITED STATES PATENTS

| | | | |
|---|---|---|---|
| 2,451,934 | 10/1948 | Evans | 264/24 |
| 2,527,501 | 10/1950 | Saks | 264/24 |
| 2,951,261 | 9/1960 | Sherman | 18/5 BM |
| 2,974,369 | 3/1961 | Orthuber et al. | 264/24 |
| 3,261,055 | 7/1966 | Dart | 18/5 P |
| 3,366,993 | 2/1968 | Lemelson | 18/26 R |
| 3,491,170 | 1/1970 | Roe | 18/5 BM X |
| 3,504,063 | 3/1970 | Lemelson | 18/30 GM X |

*Primary Examiner*—J. Spencer Overholser
*Assistant Examiner*—Michael O. Sutton
*Attorney*—Paul Shapiro, Joseph E. Kerwin & William A. Dittmann

[57] ABSTRACT

A molding apparatus for producing thermoplastic articles from finely divided comminuted thermoplastic materials which may optionally be reinforced with fibers wherein the comminuted material and fibers are electrostatically deposited on the surface of a mold.

3 Claims, 35 Drawing Figures

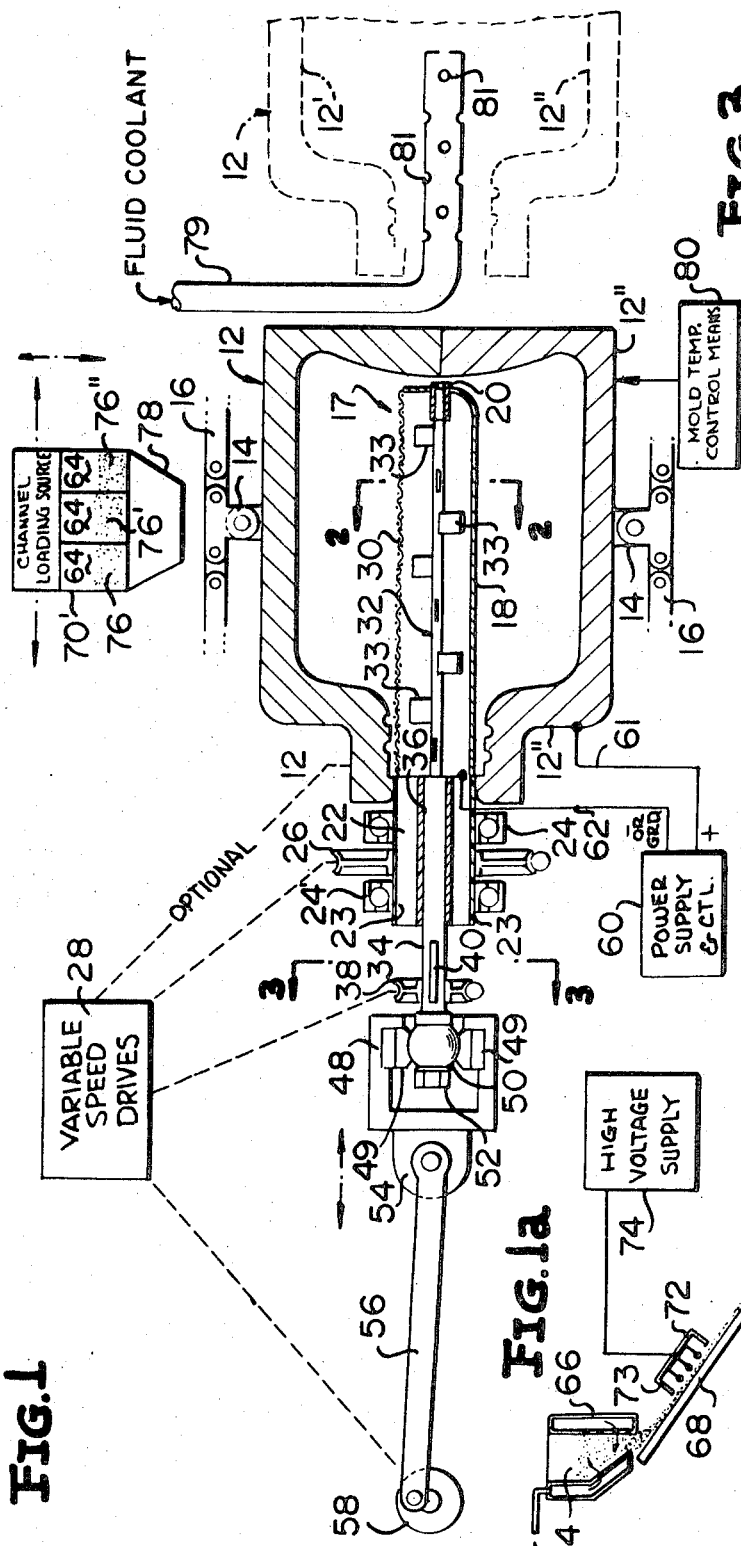

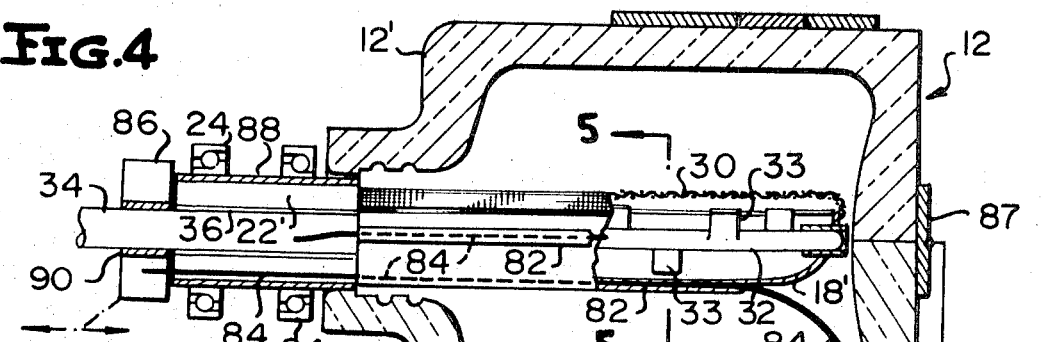
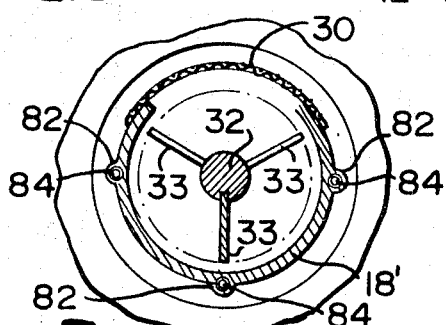
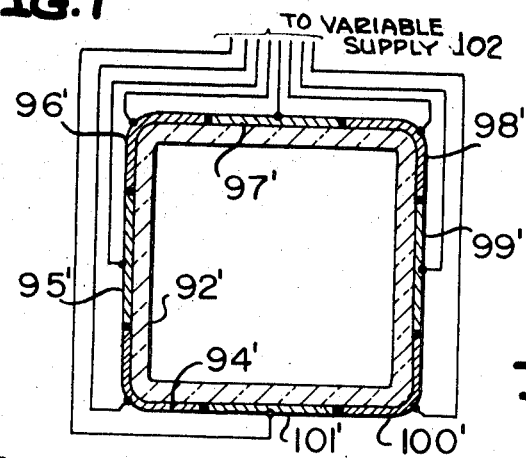
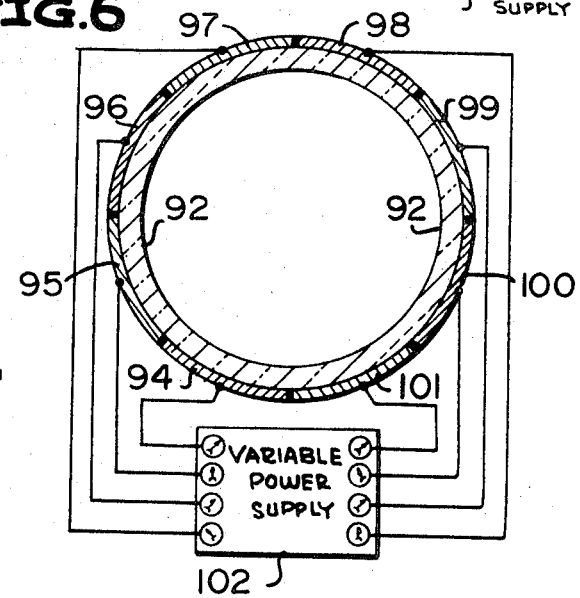
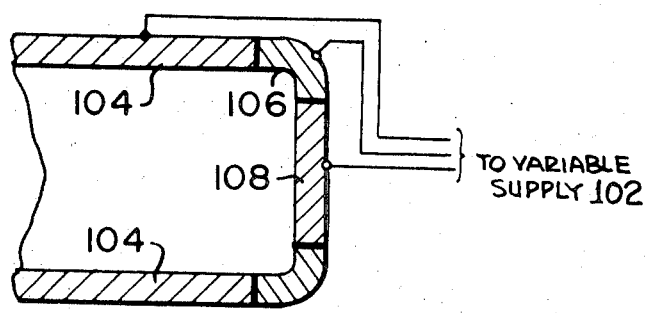
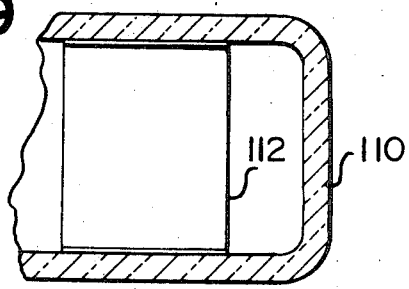

INVENTOR
HERBERT S. RUEKBERG

PATENTED MAY 15 1973
3,733,158
SHEET 4 OF 6
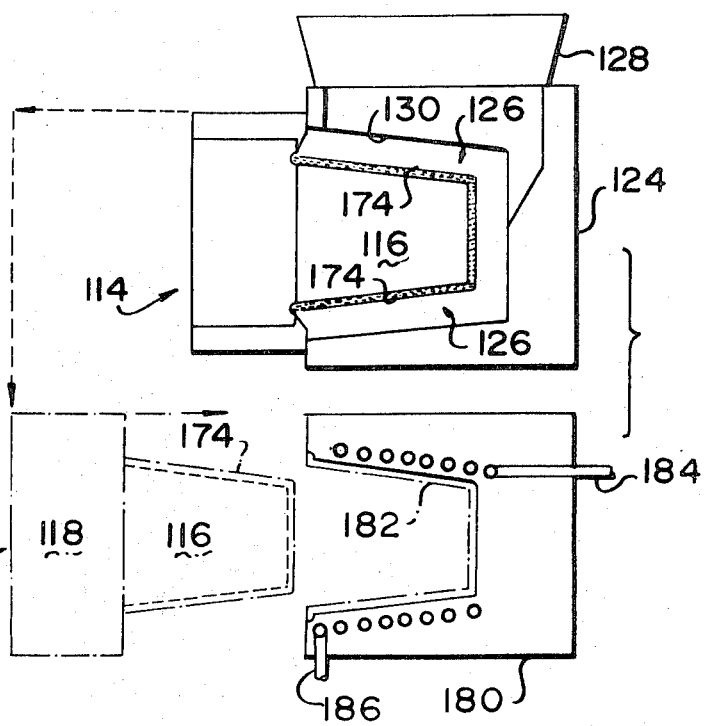
FIG. 14
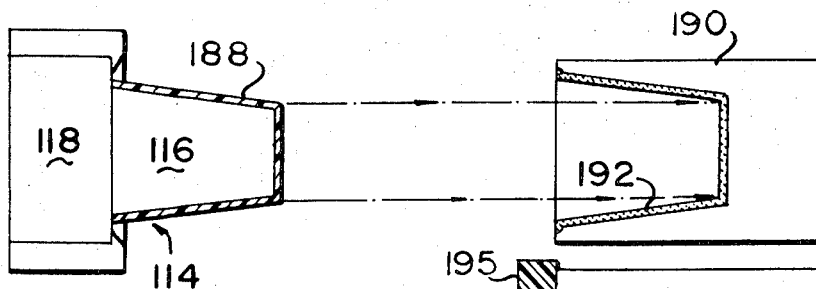
FIG. 15
FIG. 15a
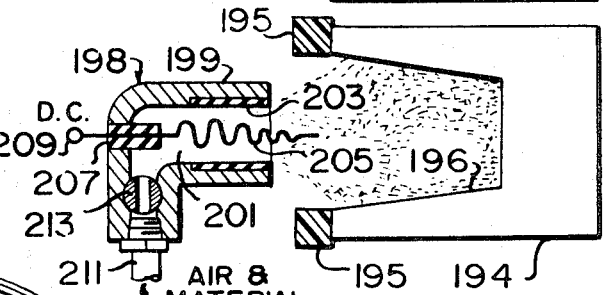
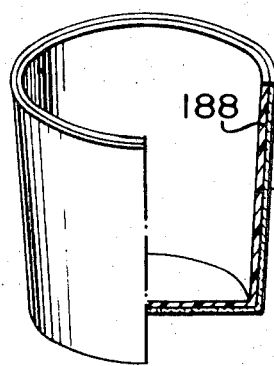
FIG. 16
INVENTOR
HERBERT S. RUEKBERG
BY
Mason, Porter, Diller & Brown
ATTORNEYS

INVENTOR
HERBERT S. RUEKBERG

BY Mason, Porter, Miller & Brown
ATTORNEYS

PATENTED MAY 15 1973 3,733,158

INVENTOR
HERBERT S. RUEKBERG

BY
Mason, Porter, Diller & Brown
ATTORNEYS

ELECTROSTATIC MOLDING APPARATUS FOR PREPARING THERMOPLASTIC ARTICLES

This is a division of Ser. No. 499,893, filed Oct. 21, 1965, and now U.S. Pat. No. 3,478,387.

This invention relates to a method and apparatus for molding and more specifically to means for producing articles and containers, such as bottles, jugs, cups, tubs, barrels, liners, and the like, by distributing an electrostatically charged comminuted material on the surface of a mold, heating the mold to fuse the article, and, if required, cooling the mold to rigidify the article. In addition, reinforced articles and containers of comminuted material having fibers embedded therein are envisioned.

One of the problems encountered in the use of molds for producing plastic articles is the control of the wall thickness. In the case of blow molding from a heat plasticized parison, the wall thickness is determined by the thickness of the parison and the distance it must stretch before encountering the wall of the mold. In the case of sintering from a powdered plastic, heavy average walls must be built up to insure against pin holes, or excessively thin weak areas that the comminuted or powdered material does not reach. For example, such areas may be found about the junction of the mold wall with the mold bottom. According to the geometric configuration of the mold, it will be evident that other areas are present in which it is difficult to direct the comminuted or powdered material.

Although the present invention relates primarily to the field of plastic molding, a number of advantages are set forth which makes the invention equally applicable in the fields of metal-forming, glass-forming, etc.

The manufacture of containers, liners, and similar hollow articles by a process involving the extrusion of a tube or parison of plastic material and, while still in the plastic condition, constricting the tube at one end and inflating it with a gas pressure, is well known in the art. This process is commonly referred to as blow molding and it is known that the process suffers from a number of limitations. One such limitation, involves the control of the uniformity of the wall thickness. In order that certain areas be continuous and free of excessively thin or weak areas, other areas are made thicker than is desirable. For example, in blow molding a container such as a jug, the plastic material does not easily reach the corners of the mold, the corners being identified as the contiguous areas about the side wall and the bottom, and the side wall and the top of the mold. Since the hot plastic must stretch further in order to reach these areas, it is necessary that the walls be built up to a greater thickness than desirable in order for the parison to fully expand in the mold and yield a product which is free of excessively thin areas throughout the container.

In accordance with the teaching of the present invention, a comminuted material is electrostatically charged and supported adjacent the mold during the mold process. By charging the mold, or electrodes juxtaposed the mold, with an electrostatic charge unlike the charge on the comminuted material, the comminuted material may be directed into all areas of the mold to thereby produce a container having a uniform wall thickness throughout.

Accordingly, it is the principal object of the invention to improve molding techniques.

It is a further object of the present invention to improve molding techniques wherein the molded articles are of thermosetting plastic, thermoplastic, glass, or metal, or any of the foregoing having fibers embedded therein.

It is a further object of the present invention to improve molding techniques wherein the molded articles are formed from a finely divided, comminuted material of plastic, glass, or metal which is induced to deposit on the surface of a mold, under the influence of electrical means.

It is a further object of the present invention to improve molding techniques wherein the finely divided, comminuted material is electrostatically charged to one polarity and a potential difference is established between the mold and the material support to induce the material to deposit on a surface of the mold.

It is a further object of the present invention to improve molding techniques by precisely controlling the wall thickness of the article produced.

It is a further object of the present invention to provide an apparatus and method whereby an article, such as a container, may be produced whose wall thickness is uniform throughout the container.

It is a further object of the present invention to provide an apparatus and method for producing multi-wall articles of finely divided comminuted material which is electrostatically deposited on the surface of a mold.

It is a further object of the present invention to provide an apparatus and method for producing multi-wall articles of finely divided comminuted material which is electrostatically deposited on the surface of a mold, the walls being of similar or dissimilar material and either fused together or separated by an air space.

It is a further object of the present invention to provide an apparatus and method for producing articles having reinforced surfaces, the reinforcing material being in the form of fibers which are oriented in predetermined patterns.

Although the invention is primarily directed to the art of forming plastic objects on the surface of a mold, the invention may be directed to similar molding processes wherein the composition of the article is of metal, glass, etc. The requirement is that the comminuted or powdered material employed as the material of which the article is fabricated, must be capable of maintaining an electrostatic charge for at least a short period of time. While the invention is applicable to the molding of articles other than articles of plastic, the description will be directed toward that end from which the manner of practising the invention in other fields will become apparent to those skilled in such fields.

The invention may be practised with male or female molds or variations and combinations of male and female molds. In one embodiment of the invention, electrostatically charged comminuted plastic material is supported within a channel. Within the channel is a rotatable bladed shaft for assisting in the dispersion of the plastic material from the channel. A screen may be positioned over the open area of the channel to aid in the dispersion and distribution of the plastic material. A mold, preferably of the split type, is then positioned around the channel containing the electrostatic comminuted plastic material. A potential of the same charge as the comminuted material is then applied to the channel and the bladed shaft. An unlike potential is then applied to the mold. The bladed shaft and channel are then rotated in opposite directions so that the comminuted material is aerated and propelled into the atmosphere inside the mold in a finely dispersed fog so that it can be attracted to the walls of the mold by electrostatic forces. As an optional feature, the mold may be rotated. The mold may be maintained at an elevated temperature so that the comminuted material would tend to fuse to itself upon contact with the mold and become rigid upon cooling. In the case of thermoplastic material, heat must be removed from the plastic after fusing until the plastic is rigid enough to be removed from the mold without distortion. If the plastic retains sufficient charge after heating, the article may be ejected from the mold electrostatically by reversing the polarity of the mold after it is opened. Alternatively, the mold may be maintained at a temperature below the fusion temperature of the material and after the distribution process has been accomplished, the temperature of the mold may be raised, causing a fusion of the material.

During the distribution of the material about the surface of the mold, means may be employed to reciprocate the blade which aids in an even distribution of the comminuted material. Also, the pitch of the blades on the shaft may be varied according to the particular requirements.

Further apparatus for distributing the powdered material includes a dispensing gun which when directed into an open mold, releases electrostatically charged material for uniform deposition in the mold.

As the distribution of the comminuted material proceeds, it is noted that the material builds up primarily on the side walls of the mold with lesser amounts at the top, bottom and any curves within the mold. The uniformity of the coating is accomplished since the already deposited coating acts as an insulator so that the material is then attracted to the areas of the mold which are not covered, or slightly covered, with electrostatically charged comminuted material. The foregoing assumes that the mold is of a conductive material.

After the distribution of the electrostatic material has been accomplished and the object fused and cooled, the mold is separated and retracted and the channel is recharged with electrostatic comminuted material.

In another embodiment of the invention, a plurality of corona wires are positioned about the channel with their ends directed into the areas of the mold in which difficulty is experienced in depositing the material.

The corona wires act to "drive" and direct the electrostatically charged material to the mold wall, which, of course, is aided by the electrostatic attraction of the electrostatically charged material to the mold of unlike charge.

In addition to the practice of the invention by using conductive molds, the employment of molds of poor conductors, such as glass, are envisioned. A number of materials are known which have a resistivity of less than $10^{12}$ ohms per centimeter which would be suitable material for molds and in which case backing electrodes would be employed. The backing electrode then provides the unlike charge for attracting the electrostatically charged comminuted material. Thus, electrodes may be placed about the mold in the areas where it is difficult to deposit material. Further, a plurality of electrodes may surround the mold in a number of geometric patterns so that multi-color and/or multi-material articles articles such as containers, may be produced. In addition, decorative inserts may be positioned about the inside of the mold so that the container is formed with its decorative material in place as soon as the comminuted material is fused.

In the molding art, it will be readily understood that the mold may be precoated with a powder or other material which aids in the removal of the finished object from the mold.

The foregoing invention may be practiced by employing closed cavities or molds for containers such as bottles or by using plugs (cores) or male molds for open containers such as cups or tubs. The apparatus and method is ideally suited for producing very large containers such as 55 gallon drums and liners therefor as well as very small articles, examples of which have been set forth. It will be intuitively clear that a uniform wall thickness may be maintained since the invention teaches and illustrates the manner in which discrete areas of the mold may be selected and comminuted material directed thereto. It is also envisioned that holes or apertures may be formed in the molded object by the positioning of an electrode in the desired area and the application of a potential which acts to repel the comminuted material.

In another embodiment of the invention which is described and illustrated, a male mold is surrounded by a chamber which communicates with a hopper or trough for supporting the comminuted material. The comminuted material may be electrostatically charged while it is in the hopper, before it enters the hopper, after it leaves the hopper, or combinations of the foregoing. Relative motion between the chamber and the male mold and the application of the electrical potential of proper polarity to the mold and chamber will cause the fine powder or material to be deposited upon the surface of the male mold upon the rotation of a dispenser within the trough. The mold may be heated to fuse the article so formed and cooled to rigidify the article as found necessary or the exterior of the article so formed may be subjected to a steam chamber or other type of heated environment.

Further ramifications include the forming of a container having an inner wall or section formed about a male mold and the forming of a similar type of article by a female mold. The outer shell formed by the female mold may then be joined to the inner shell formed by the male mold so as to provide a double wall article of similar or dissimilar materials. Further embodiments include the construction of a double wall article wherein an air space is provided between the inner and outer shell with the article being joined about the lip of the inner and outer shells or at any other appropriate points.

Electrostatic ejection means are also contemplated wherein the article after being solidified (heated and/or cooled as found necessary) may be electrostatically charged if sufficient charge does not remain upon the article and subjected to a device of unlike electrostatic charge so as to cause a removal of the article from the mold.

The formation of reinforced articles is also contemplated in the practice of the invention and the apparatus and method for accomplishing the same is set forth. Short fibers are employed to reinforce the articles. Fiberous fillers are often added to plastic materials to enhance their physical properties such as tensile strength and flexural modulus. To obtain optimum benefits from a fibrous filler, control should be maintained in the distribution of the fibers and the orientation of the fibers. The density of the fibers should be maintained evenly throughout the product and to obtain optimum physical characteristics, the fibers should be interwoven at approximately right angles to each other. After a layer of finely divided electrostatic powder is deposited on the surface of a mold, electrostatically charged fibers are evenly distributed over the layer of powder. It is the nature of the charged fibers to stand at right angles to the grounded mold (or at some other electrical potential) with one end of the fiber embedded in the tacky plastic material that was previously deposited. Thereafter, an electrode with the same electrical charge as the end of the fiber that is furthest removed from the mold is caused to traverse the mold, each fiber is repelled thus causing the fiber to lean away from the electrode and become embedded or partially embedded in the plastic comminuted material deposited. Control of the direction of the moving electrode will produce various patterns of the fibers which could be deposited upon subsequent operations. The application of the charged powder and the charged fibers may be alternated or a first layer of fibers may be applied to the plastic, oriented in a desired direction, followed by the application of a second quantity of fibers which would be oriented in a second direction. The invention is equally applicable to flat molds, male molds, or female molds or combinations of these.

The invention both as to its organization and method of operation together with further objects and advantages thereof will best be understood by reference to the following specification taken in conjunction with the accompanying figures in which:

FIG. 1 is an elevational view, partly in section, illustrating one form of the apparatus for carrying out the molding technique in accordance with the principles of the invention;

FIG. 1a is an elevational view illustrating the electrostatic charging of the comminuted or powdered material employed as the composition of which the articles produced are composed;

FIG. 2 is a cross sectional view taken along the line 2—2 of the FIG. 1 and illustrating the channel for receiving the comminuted material and the bladed shaft employed to assist in the removal of the comminuted material from the channel;

FIG. 2a is a perspective view of a portion of the bladed shaft and showing the means for adjusting the pitch of the blades;

FIG. 3 is a cross sectional view taken along the line 3—3 of the FIG. 1 and depicting a pulley arrangement for rotating the bladed shaft;

FIG. 4 is another embodiment, similar to the FIG. 1, but showing the corona wires whose ends are directed to the area of the mold in which it is difficult to cause a deposition of the comminuted material;

FIG. 5 is a cross sectional view taken along the line 5—5 of the FIG. 4 and showing the supporting guides along the channel for the corona wires;

FIG. 6 is a cross sectional view of a mold having high resistivity and wherein a plurality of electrodes are positioned about the mold for directing comminuted material to the selected areas of the mold according to the potential applied to the respective electrode by the variable power supply;

FIG. 7 is similar to the FIG. 6 except that the electrode surrounding mold is rectangular;

FIG. 8 illustrates a type of mold wherein the walls, bottom, and junction of the walls and bottom may be maintained at selected potentials according to the difficulty of depositing comminuted material on those areas of the mold;

FIG. 9 is a cross sectional view of a mold and illustrating the position of a decorative insert prior to the molding and fusing operation;

FIG. 14 is an elevational view, partly in section, and illustrating the position of the male mold while receiving the electrostatically charged plastic material followed by the insertion of the male mold and article so formed into a heated chamber for treating the article;

FIG. 15 illustrates the manner in which a male mold and a female mold may be employed to form a double wall article;

FIG. 15a shows a material dispensing gun, which may be held in the hand and employed to direct electrostatically charged material into a mold;

FIG. 16 is a perspective view, partly in section, illustrating a double wall container of similar or dissimilar material;

Figure 10:
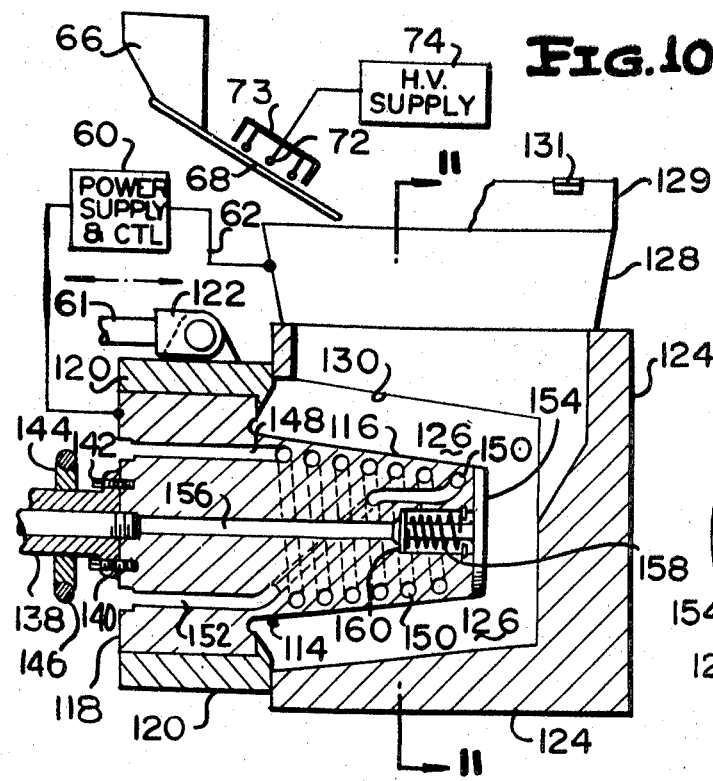
FIG. 10 is an elevational view, partly in section, of the manner in which a male mold would be employed in the practice of the invention.

The FIG. 1 shows the invention as practiced with the formation of a bottle or jug, the mold having that configuration. It will be readily understood that by using plugs, cores or male molds, open containers such as cups, tubs or the like may be produced. This will be illustrated in later figures.

In the FIG. 1, a split mold 12 has an upper section 12' and a lower section 12". Secured to each of the sections 12' and 12" of the split mold 12 is a projection 14 which may be coupled to an advancing means 16 shown in phantom outline. By this arrangement, the split mold 12 may be opened or closed and it is envisioned that a plurality of molds may be secured to the advancing means 16 so that the invention may be practiced on an automatic assembly line basis. The advancing means 16 may operate to convey the molds to the charging position as shown in the FIG. 1 or may retract the mold to a position shown in dotted outline at the right side of the drawings. The manipulation of the mold will be in accordance with the shape of the article being produced since it will be readily understood that the separation of a mold used for forming jugs and the like would necessarily be different from the manipulation of a mold for forming cups or open end containers.

As shown in the FIG. 1, a dispenser 17 or means for distributing the comminuted material within the mold comprises a channel of U-shape configuration (a cross section of which is shown in the FIG. 2) and is identified as 18. The channel 18 protrudes within the mold 12 during the molding operation and may be closed at its right end and at this end, supports a bearing 20. At its left end, the channel 18 is secured to a shaft 22, which shaft 22 is surrounded by an insulating sleeve 23 which is in turn surrounded by a pair of bearings 24 and 24'. Alternatively, the shaft 22 could be of an insulating material. The inner races of the bearings 24 and 24' engage the insulating sleeve 23 while the outer races of the bearings 24 may engage any suitable supporting means (not shown) for providing the necessary support. A pulley 26 is secured to the sleeve 23 about the shaft 22 and through its coupling to a variable speed drive 28, rotational motion may be supplied to the channel 18.

As best shown in the FIG. 2, the open portion of the U-shaped channel 18 may be surrounded by a screen 30 although the use of the screen 30 is optional. The distribution of the comminuted material may be made more uniform through the use of the screen 30 since it will act to further disperse the powdered plastic or comminuted material into a fine mist and as hereinafter set forth and assist in driving the particles towards the walls of the mold due to its electrostatic charge. The screen 30 may be removed in any suitable manner during the loading of the comminuted material into the channel 18.

A bladed shaft 32 having the blades 33 at spaced intervals projecting therefrom, is positioned within the channel 18 and supported at its right end by the bearing 20 which is affixed to the end of the channel 18. At its left end, the bladed shaft 32 is connected to or enlarges to become a shaft 34 which passes through an aperture in the shaft 22. A longitudinal extending sleeve bearing 36 of circular construction surrounds the shaft 34 and fits within the aperture of the shaft 22. By this arrangement, independent motion of the shafts 22 and 24 may be accomplished.

Rotational motion is supplied to the shaft 34 by a pulley 38 which is secured thereto by a key 40. The pulley 38 is driven by the variable speed drive 28. Under usual conditions, the pulley 38 would be driven in a direction opposite to the pulley 26 so that the contra-rotating bladed shaft 32 and channel 18 would provide maximum dispersion of the comminuted material from the channel.

The blades 33 on the bladed shaft 32 are adjustable and their pitch may be changed in a manner shown in the FIG. 2a. Each of the blades 33 has a projecting shaft 42 which is received into an aperture 44. A set screw 46 then locks the blade 33 into the desired position.

As shown in the FIG. 3, the shaft 34 is keyed to the pulley 38 by the key 40. It is understood that a mating keyway is provided in the shaft 34 and the pulley 38 to receive the key 40. As shown in the FIG. 3 and perhaps best in the FIG. 1, a cylindrical jaw 48 receives a bearing 49 which engages a ball joint 50 which is connected to the end of the shaft 34 and secured thereto by a nut 52. The cylindrical jaw 48 has a projection 54 to which is pinned a link 56 which provides reciprocating motion by its connection to a crank 58. The crank 58 is given rotational movement through its coupling to the variable speed drive 28. By the foregoing ball joint 50 and cylindrical jaw 48 arrangement, the bladed shaft 32 is given reciprocating motion while at the same time permitting the rotary motion supplied by the pulley 38. In this manner, a uniform distribution of the comminuted material placed in the channel 18 is accomplished.

In order that the principles and features of the invention be carried out, a potential difference is established between the channel 18 and the mold 12. This voltage is supplied by a power supply and control circuit 60 which has its positive output connected to the mold via a conductor 61 and its negative output connected to the channel 18 via a conductor 62. Since the connection of the conductors 61 and 62 to the mold 12 and the channel 18, respectively, would be to rotating members, the electrical connection is through the use of conventional slip ring (shown diagrammatically as a large dot) or the like. Further, it will be understood that the polarity of the power supply may be reversed since the polarity is dependent upon the electrostatic charge of the comminuted material and it will be readily understood that comminuted material, to be hereafter described, may be charged either positively or negatively, according to the material.

Since the channel 18 is not electrically insulated from the screen 30 or the bladed shaft 32, then these elements will be at the same potential as the channel 18.

Assuming that the channel 18 is to be charged negatively, then the comminuted material to be supplied for the molding process must likewise be charged negatively. Suitable comminuted material may include thermosetting plastics that fuse and set while heated or thermoplastic material such as polyethylene, polystyrene, polypropylene, polyurethane, etc. in which case the mold must be heated to fuse the material and then cooled to rigidify the casting. Another suitable material is the commercially available non-conductive toner material manufactured by the Xerox Corporation. These toner particles are composed essentially of pigmented or dyed particles of a mixture of n-butyl methacrylate (41 percent) and polystyrene (59 percent), with an average particle size of approximately 17 microns.

After the comminuted material is selected, and before application to the channel 18, it is appropriately charged (for example, negatively) as shown in the FIG. 1a. The particles or comminuted material 64 are loaded into an aerated bin 66 and caused to pass over an inclined table 68 and by gravity into a collector 70. During the passage of the material 64 across the table 68, they pass under a plurality of corona needles 72 which are supported within a housing 73 and connected to a high voltage supply 74, as shown. During the passage of the material 64 under the corona needles 72, the material 64 will become electrostatically charged, and in the particular example selected, the electrostatic charge will be negative. The electrostatically charge comminuted material 74 may be loaded directly from the table 68 into the channel 18, or it may be loaded into the channel 18 from the collector 70. A collector 70' is shown above the mold 12 and is similar to the collector 70 except that partitions are supplied so that three areas are available for supplying different types and/or colors of comminuted material to the channel 18. The means 70' is identified as a channel loading source and may reciprocate by any suitable means for distributing the comminuted material in the channel 18. As noted, the channel loading source 70' has a first compartment 76, a second compartment 76' and a third compartment 76'' all communicating with a common hopper 78 which is directed to insert the electrostatically charged material 64 into the channel 18. It will be readily understood to those skilled in the art, that the corona charging of the particles is well known and may be accomplished in the manner set forth or a simple arrangement following the teaching of the FIG. 1a may be employed to charge the particles as they enter the channel 18. Further, it will be understood that the polarity of the power supply 60 may be reversed so that a positive po-tential is now applied to the channel 18. In this case, the comminuted material 64 would be electrostatically charged in a positive direction by the high voltage supply 74 of the FIG. 1a.

The temperature of the mold 12 must be controlled in order that the comminuted material be fused to form the molded article. Accordingly, a mold temperature control means 80 is shown in block form and would be of any conventional construction so as to provide the desired temperatures. The mold temperature control means 80 may maintain the mold 12 at an elevated temperature so that the powder is then introduced into a hot mold and fuses to itself as it touches the surface of the mold 12. Alternatively, the comminuted material 64 may be distributed about the walls of the mold 12 and then the mold would be heated and the material 64 will fuse as in conventional sinter molding. The mold would be cooled causing the material to solidify and then be removed from the open mold by conventional means.

An apparatus adapted to quickly cool the interior of an article is shown cooperating with the mold 12, in phantom outline in the FIG. 1. A pipe or conduit 79 is inserted into the mold and article and a fluid coolant such as cooled water vapor, air, etc., is supplied to the conduit 79 which emits the coolant via a plurality of apertures 81. The conduit 79 may be inserted and withdrawn as found convenient or necessary.

The embodiment shown in the FIG. 4 is similar to that illustrated in FIG. 1 except that a plurality of corona wires have been added to assist in directing the charged comminuted particles to desired areas and, in addition, a plurality of longitudinally spaced electrodes are shown. As best shown in the FIG. 5 which is a cross sectional view taken along the lines 5—5 of the FIG. 4, the modified channel 18' has been fitted with a plurality of projections into which are formed longitudinal openings 82. Into each of the longitudinal openings 82 is positioned a plurality of corona charging wires 84. With reference again to the FIG. 4, the corona wires 84 extend through openings in the shaft 22' and have their ends rigidly connected to an insulator block 86. The pair of bearings 24 are insulated from the shaft 22' by an insulating sleeve 88. The shaft 34 runs in the circular bearing 36 and is insulated from the insulator block 86 by an insulating sleeve 90. The insulator block 86 slides on the shaft 34 so that the corona charging wires 84 can be retracted during the positioning and removal of the mold 12.

Illustrative of the positioning of external electrodes, a plurality of longitudinally spaced electrodes 81, 83 and 85 surround the mold 12 and an end electrode 87 may have potentials of unlike charge to the comminuted material applied thereto for assisting in depositing the material in the desired areas.

The power supply is not shown in the FIG. 4; however, it is similar to the supply of the FIG. 1 except that different voltages of the same polarity would be applied to the electrodes 81, 83, 85 and 87 while the the channel 18', bladed shaft 32, blades 33, screen 30, corona wires 84, and the comminuted material (not shown in the FIG. 4) are at opposite polarity. Since the channel 18', screen 30, bladed shaft 32, blades 33, and corona wires 84 are not insulated from each other, the application of an electrical potential to any of these elements would place all of the elements at substantially the same potential. This potential would be applied in any manner well known in the art such as by a brush arrangement or the like.

The FIGS. 6 and 7, as well as the FIG. 4, illustrate the positioning of electrodes about molds which are poor conductors. Such molds may be of certain types of glass. Electrodes are positioned about the molds and different potentials may be applied to the electrodes according to the difficulty of depositing electrostatically comminuted material in the area associated with the electrodes. For example, in the FIG. 6 a circular mold 92 is surrounded by a plurality of sectionalized electrodes 94 through 101. Each of the electrodes 94 through 101 is connected via a conductor, as shown, to a variable power supply 102 having a plurality of taps, a tap per electrode. Each of the taps of the power supply 102 is capable of supplying a different potential or voltage to its associated electrode. In the areas of the mold where it is least difficult to deposit the electrostatically charged material, the power supply through its associated tap would supply a lower voltage to the electrode in that area than to the electrodes positioned in the areas of the mold where it is difficult to deposit the material. This feature will be better illustrated with subsequent reference to the FIG. 7.

With continued reference to the FIG. 6, certain of the electrodes may have applied thereto through the variable power supply 102 zero voltage or even a voltage or potential of like charge as the electrostatically charged comminuted material so that little or no material would be deposited in that area associated with that particular electrode. This would be most helpful in the event that it is desired to form openings or apertures in the article to be molded. In addition multi-colored containers may be formed by applying a potential only to certain selected ones of the electrodes during the distribution of a particular color of electrostatically charged material and at subsequent distribution times, applying potentials to others of the electrodes so as to attract the second color or electrostatically charged material. For example, in the FIG. 6, if a two color container is desired, then the electrodes 94, 96, 98 and 100 could be charged to a potential to attract the first color of electrostatic material while the remaining electrodes 95, 97, 99 and 101 are held at a potential similar to the electrostatically charged material. Subsequently, with the introduction of the charged material of the second color, the potentials on the electrodes would be reversed so that the electrodes 95, 97, 99 and 101 would attract the electrostatically charged material while the electrodes 94, 96, 98 and 100 would repel the second color of electrostatically charged material. Thus, a two colored container having alternate areas of the two colors has been formed.

In the FIG. 7, a substantially square mold 92' is illustrated. The mold 92' is surrounded by the electrodes 94' through 101' with the even numbered electrodes being positioned at the four corners of the mold 92'. The odd numbered electrodes are substantially flat since they are positioned in the straight portions of the mold 92'. In a mold of the type illustrated in the FIG. 7, there is a greater tendency for the electrostatically charged comminuted material to deposit in the mold 92' in the areas adjacent the electrodes 95', 97', 99', and 101' rather than in the corner electrodes 94', 96', 98', and 100'. To overcome this deficiency and to produce an article or product of uniform thickness, a greater voltage would be applied to the corner electrodes 94', 96', 98' and 100' so as to increase the attraction of the electrostatically charged material to these areas of the mold rather than in the flat areas where it is somewhat less difficult to achieve a deposition of the material.

The FIG. 8 illustrates a mold having low resistance which is sectionalized so that the wall, corners, and bottom or end may have different voltages applied thereto. The wall of the mold forms an electrode 104; the corner forms an electrode 106; and the end forms an electrode 108. The various sections are insulated from each other, as shown. In the order of the affinity of the electrostatic material to deposit upon the inside of the mold, the greatest affinity is in the area about the electrode 104, the next is in the area about the end electrode 108, with the least affinity being in the corner areas about the corner electrode 106. Accordingly, in order of greatest voltage to least voltage, the larger potential of unlike charge would be applied to the corner electrode 106, a smaller potential to the end electrode 104. In this manner, a substantially uniform container may be formed since the problem of overcoming the deposition of electrostatic material in the difficult areas of the mold has been overcome by increasing the attraction of the material in the areas of the mold most difficult to deposit the material.

The FIG. 9 illustrates a mold 110 which has inserted therein a decorative insert 112 which would be positioned within the mold before the deposition process has commenced. By utilization of the decorative insert 112, a pre-decorated container may be formed, thus eliminating the step of decorating the container after its formation. such decorative insert 112 may bear trade names, trade-marks, instructions, etc.

The operation of the apparatus will now be set forth. The comminuted material is electrostatically charged by passing it over the table 68 and under the corona needles 72 of the FIG. 1a. For the purposes of this example, a high negative voltage is applied to the corona needles 72 from the voltage supply 74 so that the particles take on a negative charge. Alternatively, the material may be charged in the channel 18 by corona pins, shown in subsequent figures. With the mole 12 in its retracted position in dotted outline in the FIG. 1, the electrostatically charged comminuted material 64 is distributed within the channel 18 by the channel loading source 70'. The channel loading source 70' is then withdrawn and the advancing means 16 then positions the split mold 12 comprising the mold sections 12' and 12" in the position shown in solid outline in the FIG. 1. The power supply and control circuit then applies a positive charge to the mold 12 via the conductor 61 and via the conductor 62, a negative charge to the channel 18, bladed shaft 32, the screen 30 and the charge comminuted material contained in the channel 18.

If it is desired that the material be applied to a hot mold, then the mold temperature control means 80 would maintain the mold 12 at the desired temperature. If it is desired that the comminuted electrostatically charged material be distributed prior to heating, then the mold temperature control means 80 would maintain the mold below the sintering temperature of the material until such time as the distribution of the material has been completed.

The variable speed drive 28 is now actuated so that through the pulley 26 the channel 18 is rotated in one direction while the pulley 38 rotates the bladed shaft 32 with its projecting blades 33 in the opposite direction. In addition, the reciprocating means is started by rotation of the crank 58 which reciprocates the bladed shaft 32 within the channel 18. The material is propelled in a finely dispensed fog into the atmosphere of the mold.

The electrostatically charged material is now attracted to the mold 12 wall since it is of an unlike charge. As the deposition of the material proceeds, the material builds up in the areas perpendicular to the bladed shaft and this build up of material, tends to insulate the electrostatic attraction of the mold under the area of the build up so that the charged material then is more attracted to the ends and corners of the mold. After all of the charged material has been evacuated from the channel 18, a substantially uniform deposit of material has been achieved throughout the mold. The mold temperature control means 80 is then manipulated so as to fuse and rigidify the material if not already heated or cooled, the power supply 60 is extinguished, the variable speed drive 28 is halted and the advancing means 16 removes the mold from the molded container or article.

In the alternate arrangement set forth in the FIGS. 4–9, the voltages, corona wires 84 of the FIG. 4, or the decorative insert shown in the FIG. 9, would be adjusted and manipulated as previously set forth.

Multi-colored containers as well as containers of different material may be produced in the minutely electrical conducting mold shown in the FIGS. 6 and 7. If a greater agitation of the material is desired, then the pitch of the blades 33 coupled to the bladed shaft 32 would be adjusted as shown in the FIG. 2a.

Figure 11:
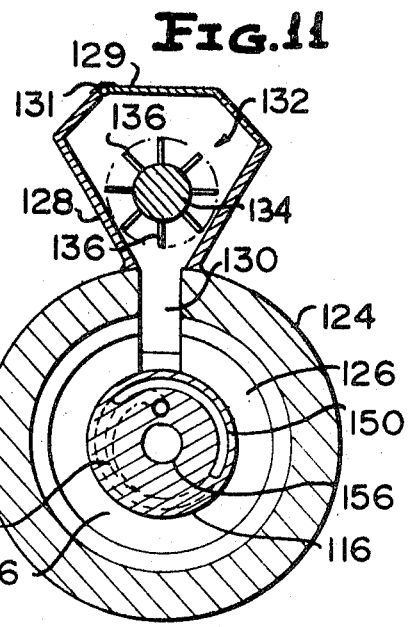
FIG. 11 is a sectional view taken along the line 11—11 of the FIG. 10.

With reference to the FIGS. 10 and 11, an arrangement is set forth wherein a male mold may be utilized in the practice of the invention. A male mold 114 includes a core 116 upon which the powdered material is deposited for molding and a circular base section 118. An insulating sleeve 120 surrounds the base section 118 and serves to insulate the male mold 114 from a mold retraction means 122 as well as a housing 124 surrounding the core 116 of the male mold 114. The geometry of the housing 124 is such that a chamber 126 is formed between the outer surfaces of the core 116 and the inner surfaces of the housing 124.

Positioned above the housing 124 is a hopper or trough 128 which communicates with the chamber 126 via a slot 130 formed in a section of the housing 124. A cover 129 encloses the hopper 128 and is hinged at 131. An electrical potential is applied to the mold 114 via the conductor 61 from the power supply and control 60 and to the hopper 128 by the conductor 62.

In one embodiment electrostatically charged comminuted material is supplied to the hopper 128 from the aerated bin 66 which communicates with the hopper 128 via the inclined table 68. As the comminuted material passes from the aerated bin 66 across the table 68, it is subjected to a high voltage of a selected polarity applied to the corona needles 72 which are coupled to the high voltage supply 74. In other embodiments, the comminuted or powdered material to be attracted to the molds may be charged while it is in the hopper or after it leaves the hopper or combinations of before it enters the hopper, while it is in the hopper, or after it leaves the hopper. Experience and experimentation will dictate the most efficient manner for electrostatically charging the material selected for deposition upon the molds.

As shown in the FIG. 11, a powder cloud dispenser 132 is positioned within the hopper 128 and includes a shaft 134 having a plurality of projecting blades 136 coupled thereto. Rotation of the shaft 134 will cause the blades 136 to engage the powder or comminuted material and through the electrical forces established, the comminuted material will be dispersed from the hopper 128 into the slot 130 communicating with the chamber 126 to be deposited upon the core 116 of the male mold 114. Suitable means would be employed to rotate the shaft 134 at the optimum RPM. Since the core 116 of the male mold 114 is of a charge opposite to that induced upon the comminuted material in the hopper 128, the comminuted material would be attracted to the core 116. As the material builds up upon the rotating male mold 116, the rotation of the mold being hereinafter described, the areas of the core 116 receiving more electrostatically charged material than other areas will tend to insulate the more heavily coated areas so that the remaining charged material will be induced to deposit upon the thinner sections of the mold. In this manner, a uniform and even distribution of the charged material about the core 116 is accomplished. Further, a predetermined quantity of material may be loaded into the hopper 128 so that the final weight and size of the article formed about the core 116 can be accurately predicted.

The male mold 114 includes the structure for providing a number of features such as retraction of the mold, rotation of the mold, heating and/or cooling of the mold, and means for ejecting the molded article from the mold. More specifically, the mold may be retracted from the housing 124 by any suitable means such as the mold retraction means 122 previously set forth. It will be intuitively clear to those skilled in the art that other arrangements will be found suitable for moving the mold 114 and the housing 124 with respect to each other. Rotation of the mold is accomplished by a shaft 138 which is affixed to the base 118 by a flange 140 having a plurality of studs 142 securing the flange 140 to the base 118. A pulley 144 is positioned on the shaft 138 which may be driven by a belt 146.

The tapered projection or core 116 of the male mold 114 may be heated by electrical means or may be heated and/or cooled by the provision of a labyrinth of tubes embedded in the core 116 to which the temperature of the mold 114 will conform according to the temperature of fluid introduced to the tubes or passageways embedded therein. For example, a tube or passageway 148 in the base 118 communicates with a coiled tube 150 in the core 116 and exits via a tube 152 in the base 118. Thus, heated fluid induced to flow in the tubes 148, 150 and 152 will heat the mold whereas cooled fluid in the foregoing tubes will cool the mold.

Ejection of the article or product after it has been rigidified on the mold 114 may be accomplished by ejector pins, a stripper ring, or by air pressure and as an example of an ejection means, a face plate 154 forms one end of the core 116 of the male mold 114. The face plate 154 is affixed to an axially movable shaft 156 which is biased in the position shown by a spring 158. Actuation of the shaft 156 rightwardly as viewed in the FIG. 10 will cause the face plate 154 to separate from the core 16 and carry the article along with it so as to accomplish the ejection from the mold. Rather than a mechanical movement of the shaft 156 to dislodge the molded article, air pressure may be applied to a spacer 160 which will produce relative movement between the core 116 and the face plate 154.

As the mold 114 is rotated through the cooperation of the pulley 144 and the belt 146, suitable means and method would be employed to provide the cooling fluid to the tubes 148, 150 and 152 as well as electrical energy via the conductor 61 to the mold 114. In order that the invention not be obscured, these details have been minimized or eliminated.

Figure 12:
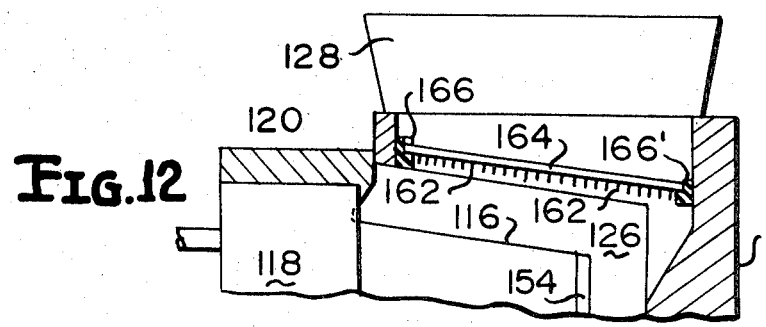
FIG. 12 is a fragmentary elevational view, partly in section, and illustrating one of the alternate positions of the corona charging pins for inducing an electrostatic charge upon the comminuted material.

It was previously set forth that a number of variations are permissible with regard to the charging of the comminuted material to be deposited upon the mold 114. One embodiment is shown in the FIG. 10 while a second embodiment is shown in the FIG. 12. More specifically, a series of charged corona pins 162 are mounted upon a corona bar 164 and positioned within the slot 130 which exists in the housing 124 between the hopper 128 and the chamber 126. The corona bar 164 is secured to the housing 124 by any suitable means such as indicated at 166 and 166' and would be supplied electrical energy as found expedient. In the embodiment shown in the FIG. 12, the material to be deposited upon the mold would be loaded into the hopper uncharged and upon actuation of the powder cloud dispenser 132 (FIG. 11) the material would be dispensed from the hopper 128 as a finely dispersed curtain of powder to be electrostatically charged as the powder or material passes the corona pins 162. Thereupon, it would be induced to deposit upon the core 116 of the male mold 114. The corona pins 162 will charge the powdered plastic particles and drive them into the chamber 126 where they will be attracted to the core 116 which is of a different electrical potential (perhaps grounded). It is preferred that the core 116 and its insulating sleeve 120 be rotated about their longitudinal axis when the powdered material enters the chamber 126. The powder in the chamber 126 will be attracted to the core 116 and will cover the entire exposed surface of the core 116 with an even coating.

Enough heat must be applied to the core 116 to melt the plastic powder and allow it to fuse together as a continuous wall around the core 116. The core 116 may be heated before the material is applied, as the material is being applied, or after the material is applied. The choice of heating times will depend upon the type of material, the size of the particles, and the thickness desired in the finished article. If the core 116 is heated before the material is supplied, it may be heated in an oven prior to the closing of the mold 114. Other embodiments have been set forth such as electrical resistance heaters in the core and in a specific embodiment set forth, circulating heat exchange fluid in the tubes 148, 150 and 152 so as to control the temperature of the core 116.

After the plastic particle has been melted and fused, it must be cooled to rigidify (in the case of thermoplastics) the article. This cooling can be accomplished by circulating cooling medium through the foregoing tubes in the core 116. Cooling can take place while the mold 114 is closed, during the opening of the mold 114, or after the mold is open. After the cooling, the article or product produced would be ejected from the core 116 by a manner such as that previously set forth.

Foamed articles can be produced if the comminuted material that is applied to the mold contains a foaming agent. The comminuted material or plastic powder would be applied to the core 116 in the foregoing manner set forth. The core 116 would then be heated after the plastic has been applied. The heat will soften the plastic so that adjacent beads will fuse with each other. The heat will also cause the foaming agent to exert pressure. This pressure, together with the fact that the plastic is heat-softened, will allow the plastic to foam and expand, thus forming a foamed product. The cooling and ejection may be the same as that set forth.

Some foamable plastic powders foam better in an atmosphere of steam. After the plastic powder is applied to the core 116, the mold 114 may be removed from the closed chamber 126 and inserted into a steam chamber such as that set forth in the FIG. 13. The core is heated at the same time that steam is injected into the chamber, thus heating the plastic article or coating from both its inner and outer sides. The article is then cooled and ejected.

Figure 13:
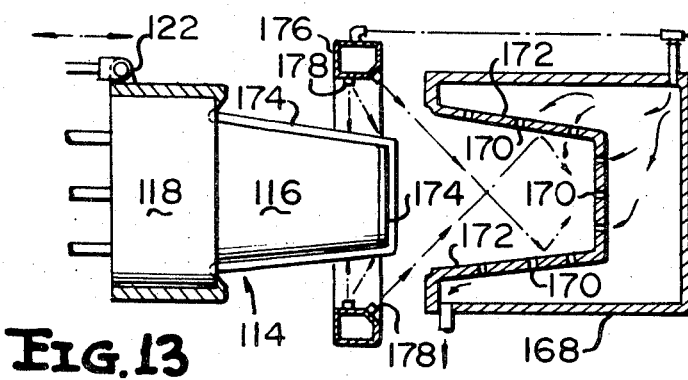
FIG. 13 is an elevational view, partly in section, showing a steam chamber in the form of a female mold and steam ring which may be employed to provide an atmosphere of steam for the article formed upon a male mold.

With reference to the FIG. 13, the mold 114 may be inserted into a steam chamber 168 having a plurality of small apertures 170 formed about a mating depression 172. Application of steam to the steam chamber 168 as shown, will heat the steam chamber 168 as well as provide a quantity of steam within the depression 172 which is applied to the outer surface of an article 174 positioned about the core 116 of the male mold 114. As the mold 114 carrying the article 174 is inserted into the depression 172 of the steam chamber 168, it may be pre-heated or steamed by a steam ring 176 having a plurality of nozzles 178 which direct the steam inwardly about the article 174 as well as forwardly toward the depression 172. Simultaneous to the heating supplied by the steam chamber 168 and the steam ring 176, the core 116 would be heated in a manner previously set forth so that heating from both sides (inwardly and outwardly) of the article 174 would be accomplished.

In certain cases, the outer finish of the article formed may not have a smooth a surface as would be desirable. In this case, the inner walls of the steam chamber, such as the steam chamber 168 of the FIG. 13, could be designed in such a way to act as a female mold (cavity) for the article. That is to say, the distance between the outer walls of the core 116 and the inner walls of the depression 172 of the steam chamber 168 would equal the wall thickness of the finished article. Thus, the inner wall of the steam chamber would form the outer wall of the article and the texture of the cavity would determine the outside finish on the product. The walls of the cavity can be heated and cooled to cure the article formed.

Figure 13A:
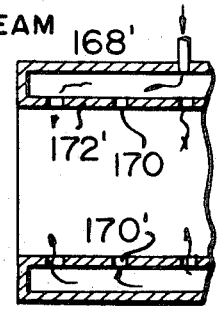
FIG. 13a is a fragmentary elevational view, illustrating a steam chamber similar to the FIG. 13 but of a cylindrical design.

The FIG. 13a illustrates a steam chamber 168' having a cavity 172' which is larger than the depression 172 of the chamber 168 and does not engage the molded article. Such an arrangement is employed when one does not wish to have the molded article engage the cavity 172'.

Such an arrangement is shown in the FIG. 14 wherein the core 116 of the male mold 114 is inserted into the chamber 126 formed by the housing 124. The powder is expelled from the hopper 128 as previously set forth and due to the electrical conditions present, is deposited upon the core 116 to form an article 174. The upper view in the FIG. 14 as well as the lower view are simplified versions wherein the rotating means, heating means, etc. are not shown.

After the article 174 has been formed upon the core 116, the male mold 114 is withdrawn from the chamber 126 of the housing 124 and follows the path indicated by the dotted line to be inserted into a mating chamber 180 which has a female depression 182 which engages the outer surfaces of the article 174. Heating or cooling fluid may be supplied to the chamber 180 by a pipe 184 and discharged by a pipe 186. The core 116 may be heated while in the chamber 126, while it is being withdrawn from the chamber 126 and inserted into the female depression 182, or while it is in the female depression 182 of the chamber 180. The walls of the female depression 182 may be contoured, textured, etc. so as to provide a design upon the surface of the article 174.

If it is desirable to make a thicker wall or a denser product and it is found that the amount of powder that will be held on the core 116 is insufficient, then a female mold may be coated in the manner set forth in the earlier figures, such as in the FIG. 1. When the coated core 116 and female mold are closed and heated, there will be a double thickness of plastic that will expand and fuse. By coating one mold with a foamable plastic and the other mold with a non-foaming plastic, the article produced can have a solid inside wall and a foam outside wall or vice versa. By coating the core with a plastic and the female mold with the same or a different plastic and having the space between the male and female molds greater than the combined walls upon the molds, a container or article may be produced with an air space between the inner and outer walls or shells.

Figure 17:
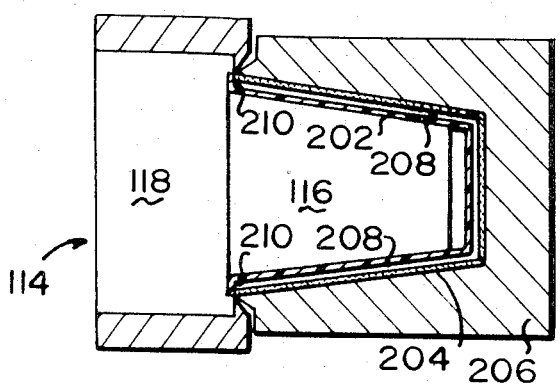
FIG. 17 represents the manner in which a double wall container having an air space between the inner and outer outer shells may be formed.

More specifically, the apparatus for producing double wall containers is set forth in the FIGS. 15 and 17. The male mold 114 is employed in the manner set forth in the FIG. 10 to deposit a coating of material thereon to form an inner shell 188 of an article. The inner shell 188 may be heated as found appropriate. Next, or simultaneously, the material dispenser 17 shown in the FIG. 1, or the apparatus to be subsequently described in the FIG. 15a, may be employed to distribute a coating of comminuted material, which may be similar to dissimilar to that of the inner shell 188, about the inner surface or female mole 190 to form an outer shell 192. It will be understood that the electrical potentials as set forth in the earlier Figures will be applied to the molds and the material dispenser so as to attract the comminuted material to the respective mold. The male mold 114 is then inserted into the female mold 190 so that the inner shell 188 and the outer shell 192 are in peripheral engagement. The molds may be heated and/or cooled as found appropriate and subsequently, the male mold 114 along with the inner shell 188 now joined to the outer shell 192 are withdrawn to form a container 200 as shown in the FIG. 16. After the male mold 116 is removed with respect to the female mold 190, the container 200 may be ejected by any convenient means, such as by stripper fingers, electrostatic charging, etc.

By coating one mold, either the male mold 116 or the female mold 190, with a foamable plastic and the other mold with a non-foaming plastic, the container 200 can have a solid inside wall and a foam outside wall or shell or vice versa. By coating the core 116 of the male mold 114 with a plastic material and the female mold with the same or a different plastic material and having the space between the male and female molds greater than the combined walls on the molds, a container with an air space between the inner and outer shell can be formed. With reference to the FIG. 17, an inner shell 202 has been formed about the core 116 while an outer shell 204 has been formed with the cavity of a female mold 206. The configuration of the core 116 and the cavity of the female mold 206 is such that an air space 208 is provided between the inner shell 202 and the outer shell 204. By suitable heating, the inner shell 202 and the outer shell 204 will be joined at their lip 210 or at other points found convenient. The article is then cooled to rigidify the article so formed and removed from the molds. The article so formed is in the form of a container 212 illustrated in the FIG. 18.

Figure 18:
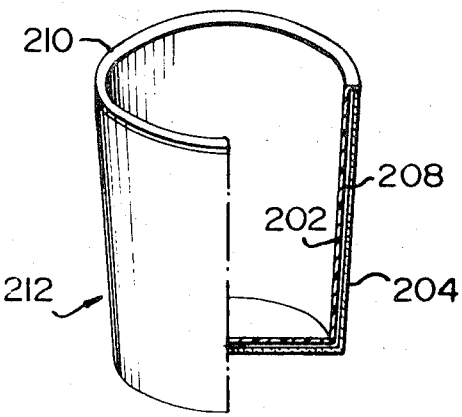
FIg. 18 is a perspective view of a container having an inner and an outer shell separated by an air space.

In the container 212 of the Fig. 18, the inner shell 202 is joined to the outer shell 204 about the lip 210 with the air space 208 being plainly evident between the inner and outer shells 202 and 204, respectively.

The FIG. 15a illustrates the manner in which a female mole 194 having a cavity 196 and surrounding insulator 195 may be charged with a dispensing gun 198, such as a Ransburg gun. The gun 198 is formed of a body 199 having an inner chamber 201. An insulating sleeve 203 is positioned within the body 199 and about a corona charging conductor 205. An insulator 207 is positioned in the body 199 and supports the charging conductor 205 as well as providing a means of externally supplying a voltage to a terminal 209. Air and comminuted material are supplied via a conduit 211 which is regulated by a valve 213. In the position shown, the valve 213 will admit the material which will be electrostatically charged as it passes the corona conductor 205. The charged material then readily seeks the cavity 196 of the female mole 194 which is charged opposite to the charged material. The FIG. 15a presents a simple and convenient method of charging a mold.

The charged comminuted material deposited upon the molds is attracted to the mold of different potential. As the material covers the mold, it begins to lose its charge and take on the potential of the mold. The heating (fusing) has a tendency to accelerate this change. The characteristics of various plastics differ as to the speed at which they will change charge and as to the influence of heat on this change. It is possible that in some material the potential of the material in contact with the mold will differ from the material furthest away from the mold. To simplify the discussion, combinations of material and wall thickness will be considered that will allow the potential throughout the wall to be essentially the same.

If a body having a potential opposite to the new potential of the plastic article formed is positioned close to the article, there is a tendency for the article to transfer to the oppositely charged body and thus be removed from the mold cavity.

Figure 19:
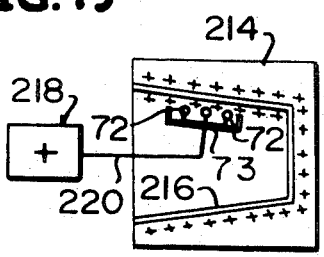
FIGS. 19 and 20 show the electrostatic charging of a formed article and its subsequent withdrawal by electrostatic ejection.
Figure 20:
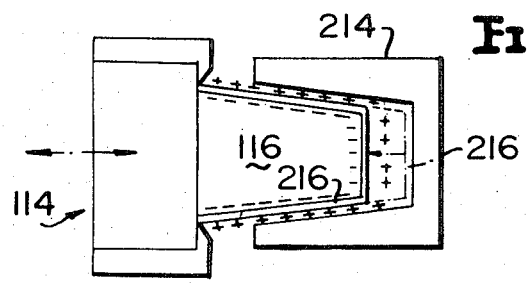

The foregoing is set forth in the FIGS. 19 and 20. A female mold 214 is shown having a cavity therein within which is formed an article 216. With the mold 214 at some electrical potential, for example positive as shown, positive charges are induced by a source 218 which is coupled to corona charging needles 72 positioned within a movable housing 73. A conductor 220 couples the source 218 to the corona needles 72. After the inner surface of the article 216 is traversed by the charging needles 72, a charge similar to that upon the female mold 214 is left upon the inner surface of the article 216. Thereafter, the housing 73 is withdrawn.

As shown in the FIG. 20, the core 116 of the mold 114 may be negatively charged and inserted into the cavity of the female mold 214. The article 216, being repelled by the female mold 214 and being attracted to the core 116, will be transferred from the cavity of the female mold 214 to the core 116. The article 216 can now be disengaged from the core 116 in any suitable manner, such as by the apparatus and in the method, set forth.

In a further embodiment of the invention, electrostatic sinter molding of fiber reinforced plastic articles, may be practiced in which reinforcing fibers have a controlled orientation. Fibrous fillers are often added to plastic materials to enhance their physical properties such as tensile strength and flexural modulus. To obtain optimum results from a fiberous filler, control should be maintained in the distribution of the fiber so that the density of the fiber is maintained evenly throughout the product and also in the orientation of the fibers. Optimum physical characteristics are obtained by interweaving the fibers at right angles to each other.

Although the method set forth may be applied to many complicated shapes and configurations, for the purposes of simplicity the invention as practiced with a plane or flat mold will be set forth.

Figure 21:
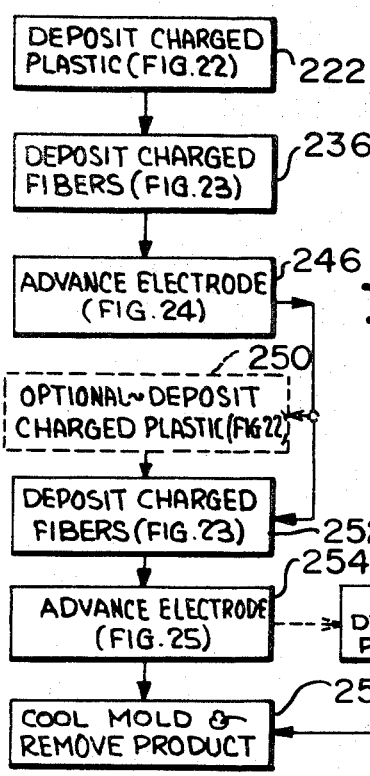
FIG. 21 is a block diagram illustrating the steps for forming a fiber reinforced article.
Figure 22:
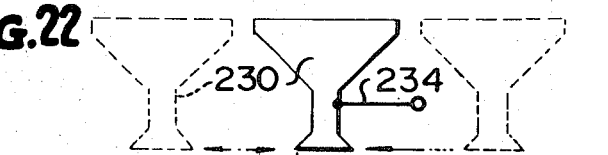
FIG. 22 illustrates the deposition of the charged plastic or comminuted material upon a flat mold.
Figure 25:
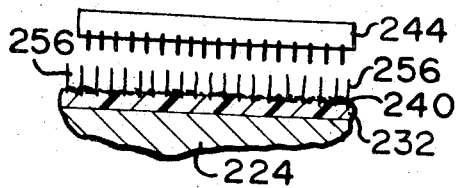
FIG. 25 illustrates the passage of a charged electrode over the fibers at a direction perpendicular to that of the FIG. 24.

The FIG. 21 is a block diagram setting forth the method and apparatus in the FIGS. 22 and 25 for accomplishing the objective. The block 222 of the FIG. 21 recites the step of depositing the charged plastic (comminuted material) as shown in the FIG. 22. A plane mold 224 is electrically charged by a suitable source on the conductor 226 and the mold 224 is supported and insulated by any suitable means such as those indicated at 228 and 228'. A powder charge or comminuted material generator 230, similar to those previously set forth, is charged with material and caused to traverse over the surface of the mold 224 and deposit a coating of material 232 thereon. An electrical potential is applied to the dispenser or generator 230 by any suitable means through a conductor 234.

Figure 23:
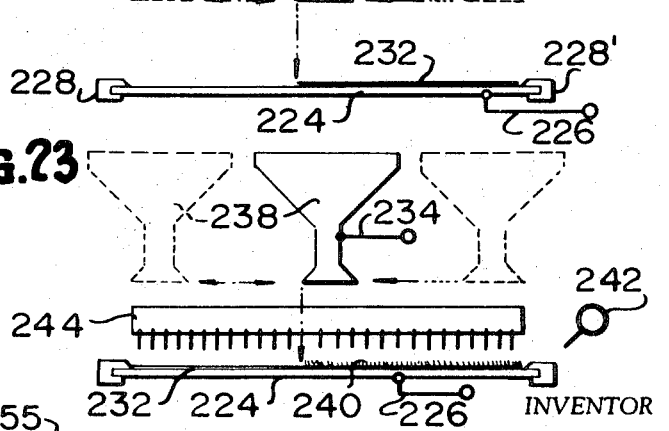
FIG. 23 shows the manner in which the charged fibers would be deposited upon the material laid down as shown in the FIG. 22.

With reference again to the FIG. 21, a block 236 recites the step of depositing charged fibers as shown in the FIG. 23. A charged fiber dispenser 238, similar to the dispenser 230 of the FIG. 22, is caused to traverse the surface of the coating 232 and to uniformly deposit a quantity of charged fibers evenly over the mold 224 and the coating 232. The mold 224 of the FIG. 22 would be heated by any suitable means so that the plastic coating 232 becomes hot and tacky. After the charged fiber dispenser 238 has traversed the mold 224 and deposited a quantity of fibers 240, it is the nature of the charged fibers 240 to stand at right angles to the mold 224, which may be at ground potential, with one end of the fiber embedded in the tacky plastic. Also disclosed in the FIG. 23 is a pair of substantially similar electrodes 242 and 244 having projecting needles extending therefrom. The electrodes 242 and 244 are horizontal and are capable of traversing the mold 224 at substantially right angles to each other.

Figure 24:
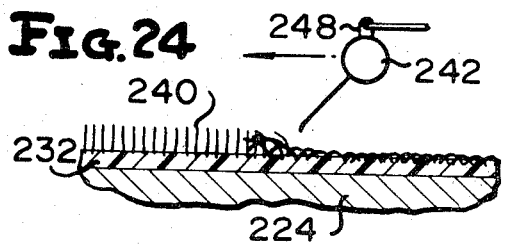
FIG. 24 illustrates the step of passing a charged electrode over the deposited fibers to result in the fibers being oriented into the tacky plastic material.

With reference again to the FIG. 21, a block 246 recites the step of advancing the electrode 242 by any suitable means, such as that indicated at 248, across the surface of the mold and already deposited materials so that as shown in the FIG. 24, as the electrode 242 approaches each fiber it repels the fiber thus causing the fiber to lean away from the electrode 242. As the electrode 242 passes over the fibers 240, the electrode 242 will tend to cause the fibers 240 to bend over into the coating of plastic material 232. The electrode 242 has the same electrical charge as the end of the fiber extending away from the mold so that a repulsion of the fibers 240 is present. In this manner, the fibers 240 are all generally oriented in one direction, such as that shown in the FIG. 24.

Next, as shown in the FIG. 21, an option is available in that after the step is performed as shown by the block 246, the step shown in a block 250 of depositing charged plastic again as set forth in the FIG. 22 may be performed or a second deposit of charged fibers may be applied as shown in a block 252. Whether the step set forth in the block 250 is performed or not will depend upon the wall thickness desired, the quantity of fibers laid down in the step set forth in the block 236, the nature of the material, etc.

After the step shown in the block 252 of the FIG. 21 is again performed, the electrode 244 of the FIGS. 23 and 25 is advanced at substantially right angles to the advancement of the electrode 242 in the FIG. 24. This step is set forth in a block 254 of the FIG. 21. The second deposit of charged fibers is identified as 256 in the FIG. 25 and the motion of the electrode 244 would be perpendicular to the plane of the paper so that the fibers 256, after the passage of the electrode 244, would be disposed at substantially right angles to the fibers 240. Next, a layer of charged plastic may be deposited over the fibers 240 and 256 as indicated by the optional block 255 after which the mold is cooled and the product removed as shown in a block 258 of the FIG. 21.

The article so formed by the steps and apparatus set forth in the FIGS. 21 through 25 is a product having a plastic binder with fiber reinforcement that is biaxially oriented, thus yielding optimum physical characteristics to the article.

Similar woven fiber effects may be produced in female molds by introducing a cloud of charged plastic powder to coat the inside of a heated female mold and then following the same sequence of steps as for the flat mold shown in the FIGS. 22 through 25. However, to accomplish the orientation of the fibers in a female mold, a different type of electrode mechanism is employed.

Figure 26:
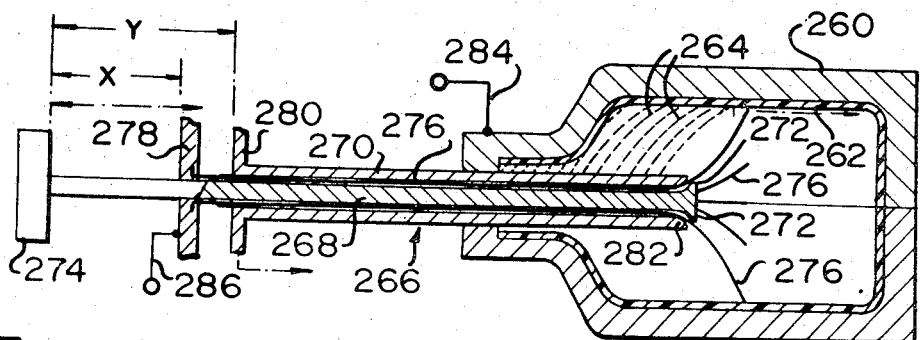
FIG. 26 illustrates a means by which the fibers may be oriented about the surface of a container formed within a female mold.

After a coating of plastic material is deposited in the manner as set forth, for example, in the FIG. 1, and a charge of fibers is deposited by a similar mechanism, the fibers will take a position with their axis normal to the wall of a split mold 260 as shown in the FIG. 26. The tacky plastic is indicated at 262 and the fibers at 264. A rotatable probe 266 is comprised of an inner shaft 268 and an outer sleeve 270. The inner shaft 268 is enlarged at its right end as indicated at 272 and at its left end, includes a pulley or hand wheel 274 by which the probe 266 may be rotated. Between the inner shaft 268 and the outer sleeve 270, are positioned a plurality of longitudinally directed and axially extending electrodes 276 which are connected to a plate 278 surrounding the inner shaft 268. The outer sleeve 270 terminates at its left end in a plate 280 and is tapered at its inner periphery as indicated at 282. Electrical potentials are applied to the mold 260 by a conductor 284 and to the plate 278 communicating with the electrodes 276 by a conductor 286. As an example, the mold 260 may be at ground potential while the potential applied to the conductor 286 may be at some high positive potential.

After the plastic material 262 has been deposited and becomes tacky by the application of heat to the mold 260, and the fibers 264 are deposited and assume a position with their axes normal to the wall, the mold 260 is revolved on its longitudinal axis. The electrodes 276 have the same charge as the end of the fibers 264 farthest from the mold wall. By advancing and retracting the probe 266, the points of the electrodes 276 will scan the cavity from bottom to top. By varying the distance "X," the length of the electrodes 276 protruding from the probe 266 may be controlled. By varying the distance "Y," the relationship between the taper 282 of the sleeve 270 and the enlarged portion 272 may be controlled, thus controlling the angle of the protruding electrodes 276. By further controlling the relationship between the speed of rotation of the mold 260 and the location and direction of the motion of the tips of the electrodes 276, the orientation of the fibers is established as they are repelled by the charged electrodes 276 and forced to lay into or on the tacky plastic 262.

Figure 30:
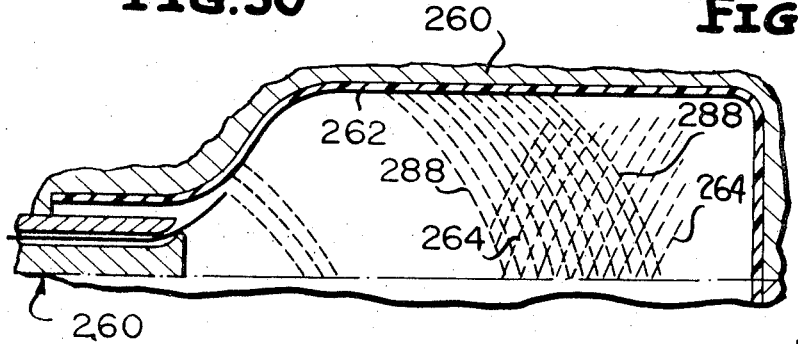
FIG. 30 shows the interwoven nature of the pattern produced by two applications of fibers.

After the first layer of fibers has been oriented, a second layer of fibers is deposited and the probe 266 is again positioned within the mold 260. By reversing the rotation of the mold 260 and controlling the movement of the probe 266 under controlled programming, the second group of fibers will be laid down in a pattern crossing the pattern of the first fibers. This is succinctly set forth in the FIG. 30 where the first group of fibers is indicated at 264 and the second group of fibers is indicated at 288. After the foregoing is accomplished, it will be followed by cooling the mold 260 to harden the plastic or another coating of plastic may be laid over the oriented fibers. Subsequently, the mold 260 is opened and the product so formed is ejected.

In either of these methods, instead of using a thermoplastic material which requires heat for softening the plastic and cooling for hardening the plastic, it is possible to employ any material that will remain tacky for a fixed period of time and then rigidify. In the case of thermosetting material, the powder becomes tacky when heated and gradually becomes hard upon further heating.

Figure 27:
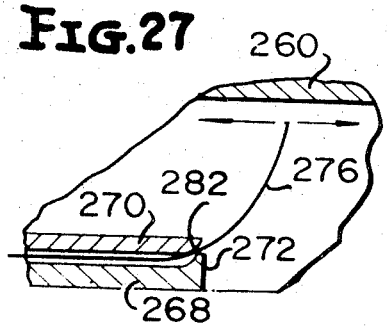
FIGS. 27, 28 and 29 show the manner in which the position of the protruding electrodes of the apparatus of the FIG. 26 may be controlled.
Figure 28:
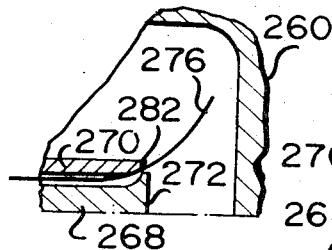
Figure 29:
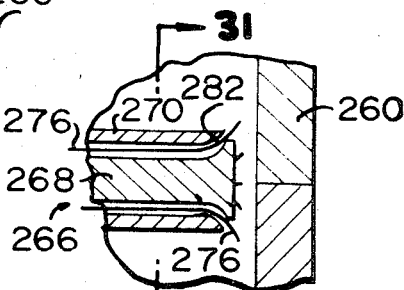

The manipulation of the probe 266 to obtain orientation of the projecting electrodes 276 is set forth in the FIGS. 27, 28 and 29. By varying the distance "Y" illustrated in the FIG. 26, the relationship between the tapered surface 282 and the enlarged portion 272 will be altered so as to change the general direction at which the electrodes 276 project from the end of the probe 266. Also, by varying the distance "X," the length of the probe 276 projecting beyond the enlarged portion 272 is varied.

Figure 31:
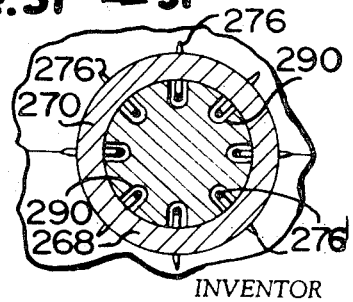
FIG. 31 is a sectional view taken along the line 31—31 of the FIG. 29.

The FIG. 31 is a sectional view taken along the line 31—31 of the FIG. 29 and illustrates the electrodes 276 positioned within a plurality of longitudinally and axially extending slots 290 in the inner shaft 268. The tips of the electrodes 276 are shown extending above the upper sleeve 270.

Thus, it will be evident that the foregoing invention may be practiced in many forms and embodiments. The apparatus and method described is capable of producing containers and articles having walls of substantially uniform thickness. The articles thus produced are free of pin holes in all areas and a savings of material may be effected in that heavy walls do not need to be built up in the areas where it is least difficult to deposit the electrostatically charged material. The process can be practiced employing closed cavities for containers such as bottles and jugs or by using male molds for producing such articles as cups, tubs, liners, barrels, etc. Holes or openings can be produced in the product by leaving certain sections of the mold uncharged or reversely charged. By charging separate sections of the mold in sequence and introducing different colored material or different material in sequence, multi-color or multi-material articles can be produced. Although the invention has been directed to the field of plastics, the invention may be applicable to processes practiced in the fields of metals, glass, etc. or mixtures of plastics, glass fibers, etc.

In other embodiments, containers having double walls have been illustrated and the manner in which the containers are fabricated has been described. The double wall containers may have the inner and outer shells fused to each other or may be provided with an air space between the shells.

Further embodiments include the illustration and description of cinter molding wherein fibers having a predetermined orientation are embedded in the plastic material so as to lend strength and rigidity to the molded product.

Thus, the present invention may be embodied in other specific forms without departing from the spirit and the essential characteristics of the invention. The present embodiments are, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. Apparatus for forming a double-walled article of inner and outer sections comprising a male mold and a female mold, means for depositing electrostatically charged comminuted material about said male mold to form an inner section of an article and within said female mold to form an outer section of an article, means for inserting said male mold and inner section of an article into the outer section of an article to cause the inner and outer sections to adhere.

2. Apparatus for molding articles comprising a housing having an open end, a mold extending into the open end of said housing and forming a chamber between said mold and the inner wall of said housing, means supported by said housing and communicating with said chamber for supporting comminuted material, means for dispensing comminuted material to said chamber for deposition upon said mold to form an article, means to rigidify the article on said mold, an article receiver having a complementary contour to the article, and means for oppositely charging the article and said receiver to attract the article to said receiver.

3. Apparatus for producing a decorated container comprising a split mold, a decorative insert positioned above the inside perimeter of said mold, means positioned within said mold and electrically insulated therefrom for dispensing comminuted material, means supported within said last-named means and adapted for rotational movement with respect thereto for agitating the material of said means positioned, means for charging said means positioned with a comminuted material, means for establishing a potential difference between said means positioned and said mold for aiding the distribution of the supported material about the inside of said mold and covering said decorative insert, means for controlling the temperature of said mold to fuse the comminuted material so distributed and said decorative insert to the material, and means for separating said mold for retriving the fused material bearing said decorative insert.

* * * * *